(12) United States Patent
Webb

(10) Patent No.: US 11,961,393 B2
(45) Date of Patent: Apr. 16, 2024

(54) SYSTEM AND METHOD FOR AUDIBLE SPATIAL DESCRIPTION FOR PEOPLE WITH SENSORY DISABILITIES AND THE AGING POPULATION

(71) Applicant: Robert Christopher Webb, Atlanta, GA (US)

(72) Inventor: Robert Christopher Webb, Atlanta, GA (US)

( * ) Notice: Subject to any disclaimer, the term of this patent is extended or adjusted under 35 U.S.C. 154(b) by 0 days.

(21) Appl. No.: 17/883,813

(22) Filed: Aug. 9, 2022

(65) Prior Publication Data

US 2023/0053019 A1 Feb. 16, 2023

Related U.S. Application Data

(60) Provisional application No. 63/231,814, filed on Aug. 11, 2021.

(51) Int. Cl.
*G08G 1/005* (2006.01)
*G07C 9/00* (2020.01)
*G08G 1/0968* (2006.01)

(52) U.S. Cl.
CPC ......... *G08G 1/005* (2013.01); *G07C 9/00309* (2013.01); *G08G 1/096805* (2013.01)

(58) Field of Classification Search
None
See application file for complete search history.

(56) References Cited

U.S. PATENT DOCUMENTS

| | | | | |
|---|---|---|---|---|
| 10,255,733 B2* | 4/2019 | Zavesky | ............... | G16H 40/67 |
| 10,744,058 B2* | 8/2020 | Novich | ............... | G06V 20/20 |
| 10,993,872 B2* | 5/2021 | Novich | ............... | A61F 9/08 |
| 11,207,236 B2* | 12/2021 | Novich | ............... | A61F 9/08 |
| 11,660,246 B2* | 5/2023 | Novich | ............... | A61H 3/061 |
| | | | | 340/4.1 |

\* cited by examiner

*Primary Examiner* — Carlos Garcia
(74) *Attorney, Agent, or Firm* — Gearhart Law, LLC; David Postolski

(57) ABSTRACT

An accessible and usable mobile device application is provided herein that integrates with a technology network designed to increase an ability to orient, locate and travel within indoor and outdoor physical environments independently, safely, and securely for people with sensory disabilities and the aging population who have visual, hearing, mobility, and/or cognitive disabilities.

13 Claims, 12 Drawing Sheets

SYSTEM AND METHOD FOR AUDIBLE SPATIAL DESCRIPTION FOR PEOPLE WITH SENSORY DISABILITIES AND THE AGING POPULATION

CROSS-REFERENCE TO RELATED APPLICATIONS SECTION

This application is a U.S. Non-Provisional Patent Application that claims priority to U.S. Provisional Patent Application Ser. No. 63/231,814 filed on Aug. 11, 2021, the entire contents of which are hereby incorporated by reference in its entirety.

FIELD OF THE EMBODIMENTS

The field of the invention and its embodiments relate to a system and method for audible spatial description for people with sensory disabilities and the aging population having visual, hearing, mobility, and/or cognitive disabilities. More specifically, the field of the invention and its embodiments relate to a system comprising an interface that provides autonomous vehicle (AV) accessibility for people with disabilities and may be used in other endeavors, such as indoor navigation, transit navigation, and intersection navigation.

BACKGROUND OF THE EMBODIMENTS

People with visual, hearing, mobility, and cognitive disabilities often have trouble traveling from one location to another. Typically, people with sensory disabilities are reliant on assistive technology. Low vision users may use screen magnification capabilities in conjunction with screen reader capabilities. Blind users may use both screen reader software and active braille display hardware. Further, deaf and blind users may use screen reader software and/or active braille displays. Specifically, active braille displays are external hardware devices that connect to desktops, laptops, and mobile devices through Bluetooth and can be used by users to receive text-based information or updates, such as a banner notification on a mobile device in braille.

Individuals of the aging population often manage multiple disabilities that include low vision, hearing impairment, cognitive impairments, and mobility impairments. Aging population users may require magnification or screen reader functionality, may need an incredibly simple and easy-to-use interface because of cognitive impairment, or may need to minimize distance they physically travel because of a mobility impairment. All of these situations create a user with unique needs that require a unique accessible solution to create equitable outcomes for using autonomous vehicles (AVs). For each of these users, equitable access to AVs facilitates better health care management, opens doors to new employment opportunities previously unavailable due to travel limitations, improves safety and security while traveling, and reduces reliance on others. Thus, what is needed is an enhanced system that provides AV access to these people with disabilities.

Examples of Related Art Include

CN110091796A relates to a system that provides alerts to guide visually-impaired passengers to a vehicle. The system includes: a passenger identification module that is configured to identify a passenger based upon sensor data received at an autonomous vehicle and a passenger proximity module that is configured to determine a distance between the passenger and the autonomous vehicle. The system also includes an alert module that is configured to generate an alert having an alert characteristic corresponding to the distance. Equipment used in this system includes: radar equipment, light detection and ranging (LIDAR) equipment, optical cameras, thermal sensation video cameras, ultrasonic sensors, pressure sensors, ultra-wide band (UWB) sensors, and/or global positioning system (GPS) receivers.

CN112394733A describes a UWB and ultrasonic-based autonomous following obstacle avoidance method for an intelligent vehicle, which overcomes the problems of insufficient following precision and incapability of avoiding obstacles.

WO2020177225A1 describes a vehicle and road coordinated high-precision vehicle positioning method based on UWB. By using advantages, including high multi-path distinguishing capacity and good anti-interference performance in a dynamic environment of UWB positioning technology, by means of rational layout of UWB nodes, and in combination with a Not Line of Sight (NLOS) error processing algorithm, a positioning error is reduced, so that the vehicle is positioned accurately and reliably in real-time in a typical urban environment.

GB2578500A and WO2018094151A1 describe a system and method for UWB signal usage with autonomous vehicles in buildings. A product distribution system in a building includes an unmanned vehicle and a control circuit in the unmanned vehicle. The unmanned vehicle operates independently within the building. The unmanned vehicle is configured to transmit and receive first UWB signals. The control circuit is configured to determine the position of the unmanned vehicle based upon an analysis of at least some of the first UWB signals, and to navigate the unmanned vehicle according to the position. The unmanned vehicle is configured to transmit second UWB signals to a device operating within the building, and responsively receive third UWB signals from the device. Based upon the analyzing of the third UWB signals, the control circuit determines a position of the device to avoid a collision between the unmanned vehicle and the device.

WO2018090181A1 describes an UWB ranging method applicable in a movable object. The method includes: broadcasting an UWB ranging request signal and receiving an UWB ranging response signal broadcasted by a movable target. The UWB ranging response signal includes: a first time difference between the transmission of the UWB ranging response signal by the mobile target and the reception of the UWB ranging request signal. The method also includes: determining a second time difference between the reception of the UWB ranging response signal and the broadcasting of the UWB ranging request signal and determining the distance from the moveable object to the movable target on the basis of the first time difference and of the second time difference. This reference also describes an UWB ranging-based obstacle avoidance method, an UWB ranging device applicable in a mobile object, an UWB ranging-based obstacle avoidance device, and an unmanned aerial vehicle system.

US20180059231A1 describes a constellation of UWB nodes, each with a UWB transceiver operating both as a monostatic/bi-static radar. The UWB constellation identifies and locates objects within a geographic area using multipath signal analysis forming an occupancy grid. The resulting occupancy grid can identify parked cars, pedestrians, obstructions, and the like to facilitate autonomous vehicle operations, safety protocols, traffic management, emergency vehicle prioritization, collisions avoidance and the like.

WO2020200910A1 describes a system and method for determining a particular vehicle state based on a UWB signal received at a plurality of receiving nodes. A plurality of channel-impulse responses (CIRs) may be computed from the UWB signal received from the plurality of receiving nodes. A plurality of peak-based features based on a selected position and amplitude may be extracted from the plurality of CIRs. A plurality of correlation-based features may be generated by correlating the plurality of CIRs to a corpus of reference CIRs relating to a plurality of vehicle states. A plurality of maximum likelihood vehicle matrices may be generated by correlating the plurality of CIRs to the corpus of reference CIRs relating to the plurality of vehicle states. The vehicle state may then be determined by processing the plurality of peak-based features and correlation-based features using the machine learning classification algorithm.

Some similar systems exist in the art. However, their means of operation are substantially different from the present disclosure, as the other inventions fail to solve all the problems taught by the present disclosure.

SUMMARY OF THE EMBODIMENTS

The present invention and its embodiments relate to a system and method for audible spatial description for people with sensory disabilities and the aging population having visual, hearing, mobility, and/or cognitive disabilities. More specifically, the present invention and its embodiments relate to a system comprising an interface that provides AV accessibility for people with disabilities.

A first embodiment describes a method executed by an application of a computing device to increase an ability of a person with a visual, a hearing, a mobility and/or a cognitive disability to orient, locate, and travel within an environment. The method includes numerous process steps, such as: receiving user selection of a destination. The method also includes configuring the AV with preferences for the specific user, where the preferences include: environmental controls of the AV, radio presets in the AV, a volume of the radio in the AV, an opened or closed status of one or more windows of the AV, an opened or closed status of a sunroof of the AV, and/or an adjustment of one or more seats in the AV, among others not explicitly listed herein.

The method also includes: receiving, from the AV comprising an anchor, GPS coordinates, three words or a three word string associated with a location of the AV and translating the three words or the three word string associated with the location into walking directions for the user to arrive at the location of the AV. The user is associated with a tag. In some examples, the anchor is mounted in a waterproof housing on a window of the AV or is incorporated into a technology housing of the AV. In examples, the anchor comprises an Ultra-wideband (UWB) anchor and the tag comprises a UWB tag. In other examples, the anchor comprises the UWB anchor and the tag comprises Bluetooth on the computing device.

As described herein, the UWB anchor and the UWB tag are interchangeable. Moreover, the UWB anchor/tag that the user carries could be an external UWB anchor/tag or could be the built-in UWB functionality of a smartphone or of a similar computing device.

In response to determining that the user is proximate the AV by communication between the tag and the anchor, the method includes: receiving a notification regarding a distance and direction between the user and the AV, determining whether the user wishes to unlock one or more doors of the AV, and executing a command to unlock the one or more doors of the AV. In response to receiving a ready command from the user, the method includes transmitting a message to the AV to begin transport if the user is fastened via seat belt and if the doors are closed.

The method further includes providing route alerts to the user during transportation from the location to the destination. The route alerts comprise directional, distance, and/or location information, among other information not explicitly listed herein. In some examples, the route alerts are temporary alerts, are text-based alerts and/or include haptic feedback, among other examples not explicitly listed herein.

During route, the application allows the user to change the destination of the AV to another destination. In some examples, if the method determines that the AV was in an accident prior to reaching the destination, the application notifies the user of the emergency, provides the user with an estimated address of the AV, and provides the user with a means to call emergency personnel to respond to the emergency. The method then includes arriving at the destination.

A second embodiment of the present invention describes a system configured to increase an ability of a person with a visual, a hearing, a mobility and/or a cognitive disability to orient, locate, and travel within an environment. The system includes, at least: a computing device comprising an application, an autonomous vehicle (AV), a vehicle control API, and a translation module configured to communicate with the AV through the vehicle control API.

The application allows the AV to be configured with preferences of the user. The preferences include: environmental controls of the AV, radio presents in the AV, a volume of the radio in the AV, an open or closed status of one or more windows of the AV, an open or closed status of a sunroof of the AV, and/or an adjustment of one or more seats in the AV, among other preferences not explicitly listed herein.

In some examples, the translation module resides in a cloud. In other examples, the translation module resides onboard the AV through a microcontroller-based module. Further, the translation module allows for the loading of custom firmware that contains a translation for a specific vehicle type of the AV.

Though this second embodiment describes navigating an environment, it should be appreciated that navigation of an indoor environment, an intersection, or a transit platform may or may not involve the AV.

Though numerous examples describe use of the system with AVs, it should be appreciated that this system described herein may be used with rideshare services, personal vehicles, subways (e.g., to navigate to the platform, as well as the station), buses, trains, indoor navigation, outdoor navigation, intersections, etc.

DESCRIPTION OF THE PREFERRED EMBODIMENTS

Figure 1:
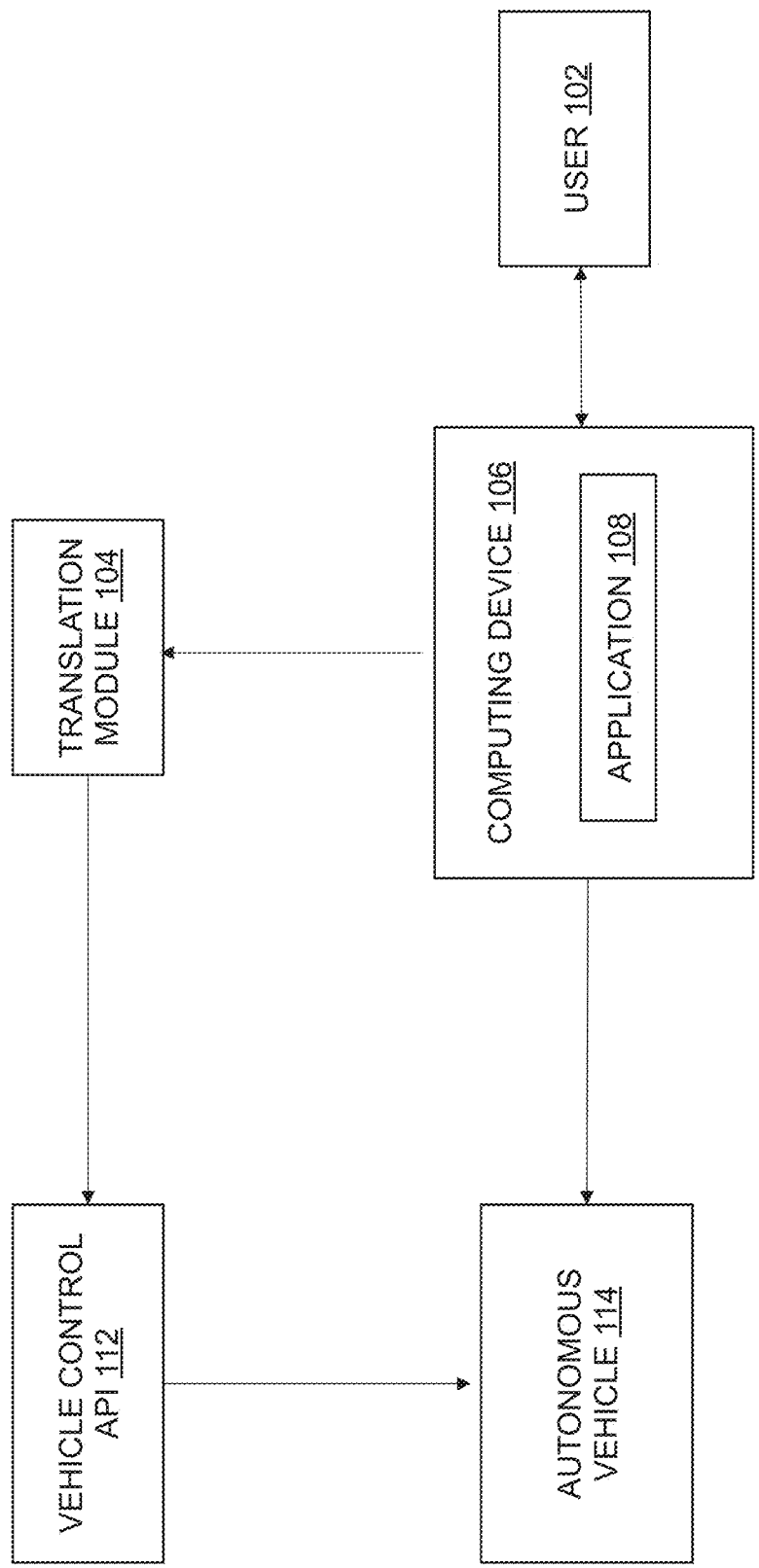
FIG. 1 depicts a block diagram of a system, according to at least some embodiments disclosed herein.

The preferred embodiments of the present invention will now be described with reference to the drawings. Identical elements in the various figures are identified with the same reference numerals. Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

An accessible and usable application executed on a computing device is provided herein that integrates with a technology network designed to increase an ability to orient, locate, and travel within indoor and outdoor physical environments independently, safely, and securely for people with disabilities (PWD) and the aging population, who have visual, hearing, mobility, and/or cognitive disabilities. Unless specifically specified herein, "PWD" refers to individuals having sensory disabilities (e.g., low vision problems, individuals who are blind, and/or individuals who are deaf and blind) and individuals of the aging population who have visual, hearing, mobility, and/or cognitive disabilities. The system described herein allows users to travel through various transportation bus systems, municipal buildings, and educational institutions independently, safely, and more securely.

The present system described herein may communicate and interface with autonomous vehicles (AV). As described herein, an "AV" is a vehicle that is capable of sensing and navigating its environment with little or no user input. Vehicle automation has been categorized into numerical levels ranging from Level Zero, corresponding to no automation with full human control, to Level Five, corresponding to full automation with no human control. Various automated driver-assistance systems, such as cruise control, adaptive cruise control, and parking assistance systems correspond to lower automation levels, while true "driverless" vehicles correspond to higher automation levels. In fact, the present system described herein solves the problems of locating AVs, interacting with AVs in routine and emergency situations, and improving safety and security of all PWD using AVs. Though numerous examples describe use of the system with AVs, it should be appreciated that this system described herein may be used with rideshare services, personal vehicles, subways (e.g., to navigate to the platform, as well as the station), buses, trains, indoor navigation, outdoor navigation, etc.

As shown in FIG. 1, the system of the present invention includes numerous components, such as an application 108 executed on a computing device 106 that comprises agnostic interface capabilities, compatible with all AVs 114, regardless of use-case, company or manufacturer, UWB technology for AV location capabilities, guidance, and safety of users, and mapping technology for delivering destination location information more accurately than postal addresses or business names alone. It should be appreciated that the computing device 106 described herein may be a computer, a laptop computer, a smartphone, and/or a tablet, among other examples not explicitly listed herein. Moreover, the application 108 described herein may be an engine, a software program, a service, or a software platform executable on the computing device 106.

In some examples, the mapping technology is powered by What3Words. However, the mapping technology is not limited to such. The components of the system function together fluidly through an AV interface. Properly designed AVs for these users 102 will increase access to employment, medical care, and all needs and wants of the community.

Different brands and models of AVs 114 have different interfaces to set a destination, find a current location, set environmental controls, or any other vehicle control the user 102 may have access to. This can be a big challenge for those with visual impairments. The present invention proposed that the AVs 114 should have a secure API (e.g., a vehicle control API 112) for application developers to interface with the vehicle's system to enable people with a myriad of disabilities to interact with the AV 114 in a consistent way utilizing the technology they know best. It should be appreciated that the application 108 and the supporting system of this invention allows users 102 to interact with and control all aspects of the AV 114 using a consistent and identical application across any brand of the AV that also provides secure access into the control system of the AV 114.

Additionally, safety and convenience are paramount when engaging with the AV 114. The application 108 allows the AV 114 to be configured to the user's preferences from the moment it is summoned, which includes ensuring the doors are locked before the AV 114 arrives for pickup to make sure nobody other than the user 102 enters the AV 114 and setting the environmental controls, so the AV 114 is comfortable for the given user 102. Examples of environmental controls include adjusting air systems of the AV 114 and adjusting a radio system of the AV 114. As the user 102 approaches the AV 114 with the application 108, the doors of the AV 114 can be automatically unlocked for ease of entering the AV 114. The application 108 also allows other functionality, such as setting a destination for the AV 114, changing a destination for the AV 114 while in route, sending vehicle location and status to friends/family, calling emergency services for the AV 114, or any other functionality provided by the vehicle's secure API (e.g., the vehicle control API 112).

Further, as shown in FIG. 1, the application 108 communicates to the AV 114 through a "translation module" 104. The translation module 104 can reside in the cloud and can communicate to the AV control system through the vehicle's secure API (e.g., the vehicle control API 112) over a network if supported, or for the AV 114 where access is only for onboard systems, the translation module 104 can reside onboard the AV 114 through a small, low power, microcontroller-based module. The translation module 104, whether cloud-based or hardware-based, is able to load custom firmware that contains the proper translation for the specific vehicle type. The firmware may be updated via cellular, WIFI, or Bluetooth communication, among other types of communication not explicitly listed herein.

The application 108 is also fully configurable and adaptable to any ability that a specific AV 114 provides. Any new features may be enabled by updating the translation module 104 software over the communication (e.g., cellular, WIFI, or Bluetooth connection), ensuring that the application 108 always supports the latest feature set for the AV 114.

Figure 2:
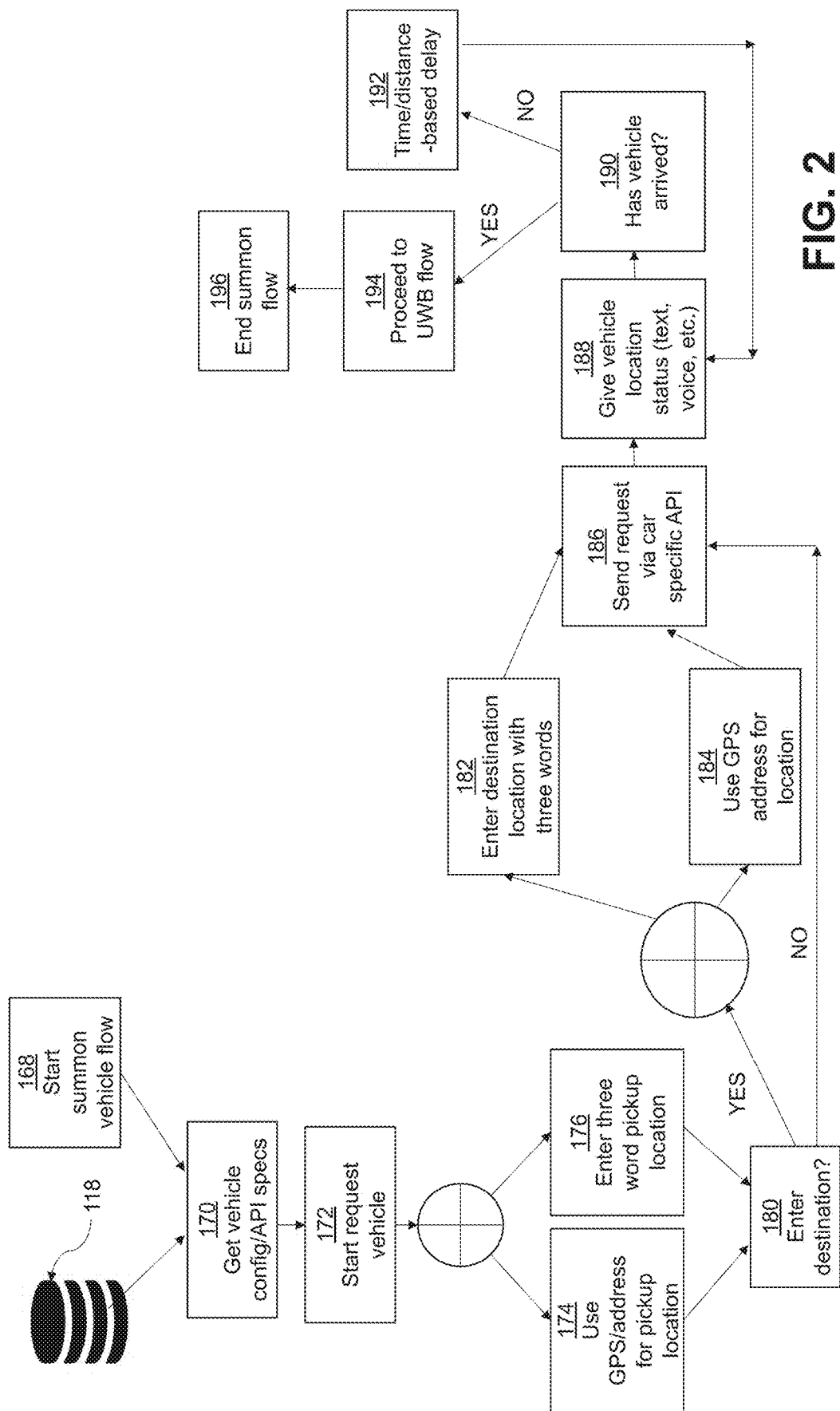
FIG. 2 depicts a block diagram of application commands/process steps to summon the AV, according to at least some embodiments disclosed herein.

FIG. 2 includes numerous process steps used by the application 108 to summon the AV 114. The application 108 may access or engage a database 118 to execute one or more of the process steps of FIG. 2. The method of FIG. 2 begins at a process step 168 to summon the AV 114.

The process step 168 is followed by a process step 170, where the application 108 gets the AV configurations/API specifications. Next, a process step 172 follows the process step 170 and starts the request for the AV 114. A process step 174 or a process step 176 follows the process step 172. The process step 174 includes the application 108 using GPS coordinates of the computing device 106 to pick up the user 102. The process step 176 includes the application 108 receiving a three word pickup location or a three word string for the user 102, which will be discussed herein.

A process step 180 then follows the process step 174 or the process step 176. The process step 180 includes the application 108 determining if the destination was entered. If the destination was entered, a process step 182 or a process step 184 occurs. The process step 182 includes the destination location being entered with three words or a three word string. The process step 184 includes the GPS being used for the location. If the destination was not entered, a process step 186 follows the process step 180 and includes sending the request via an AV specific API. The process step 186 follows the process step 182 or the process step 184.

Next, a process step 188 follows the process step 186 and includes giving the AV 114 location status via text, voice, etc. A process step 190 follows the process step 188 and determines if the AV 114 has arrived. If a YES response follows the process step 190, a process step 194 occurs, where the method proceeds to the UWB technology flow discussed herein. If a NO response follows the process step 190, a process step 192 occurs, which involves the application 108 resolving time/distance-based delays. A process step 196 follows the process step 194 to end the method of FIG. 2.

Figure 3:
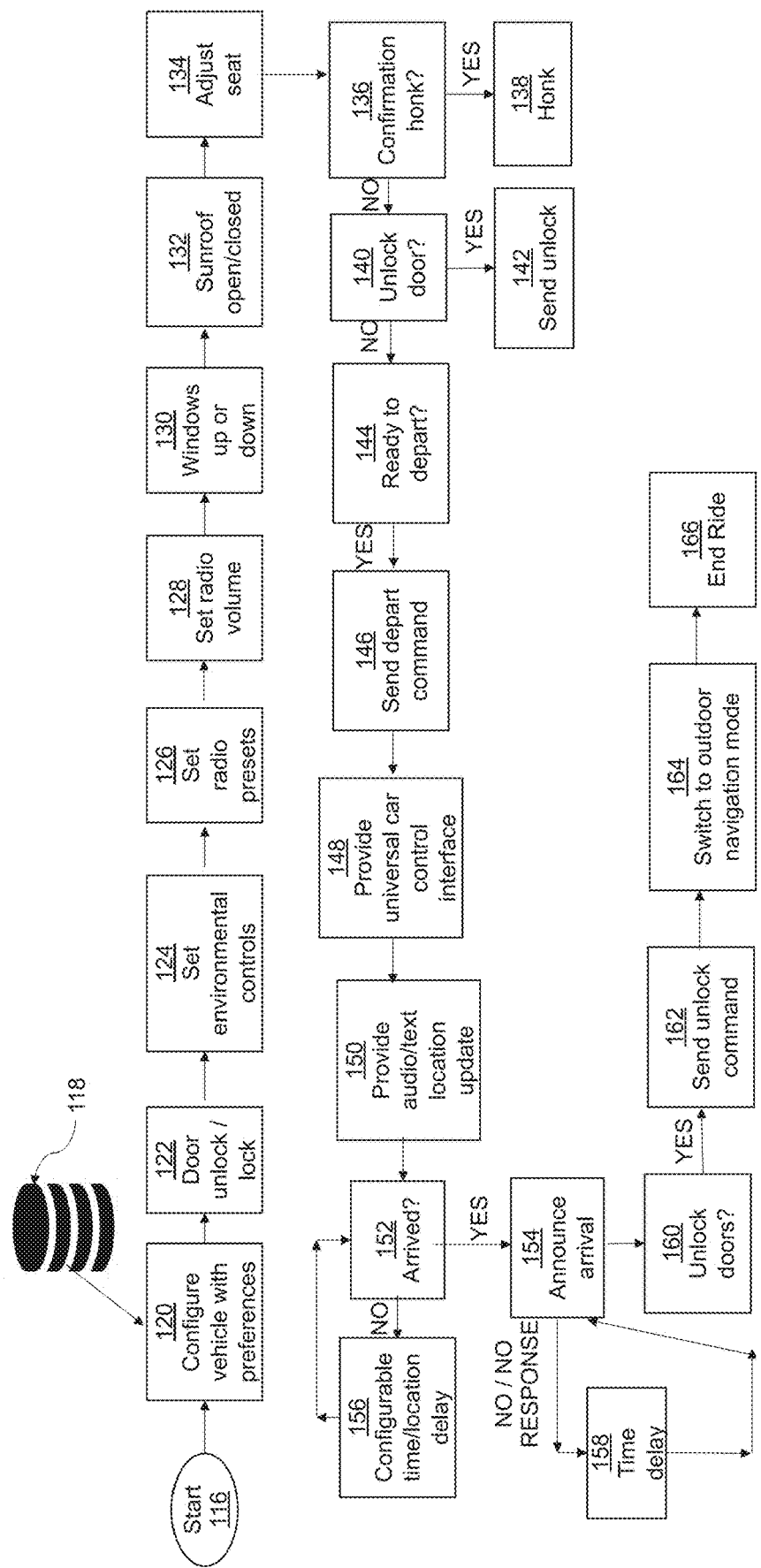
FIG. 3 depicts a block diagram of application commands/process steps executed after arrival of the AV, according to at least some embodiments disclosed herein.

FIG. 3 includes numerous commands/process steps executed by the application 108 after the arrival of the AV 114. The application 108 may access or engage the database 118 to execute one or more process steps of FIG. 3. The method of FIG. 3 begins at a process step 116. A process step 120 follows the process step 116 and includes the application 108 configuring the AV 114 with user specific preferences. Such user specific preferences include, but are not limited to: environmental controls of the AV 114, presets for a radio in the AV 114, a volume of the radio in the AV 114, an opened or a closed status of one or more windows of the AV 114, an opened or a closed status of a sunroof of the AV 114, and an adjustment of one or more seats in the AV 114.

A process step 122 follows the process step 120 and includes the application 108 unlocking/locking one or more doors of the AV 114 based on the user-specific preferences. A process step 124 follows the process step 122 and includes the application 108 setting environmental controls of the AV 114 based on the user preferences. A process step 126 follows the process step 124 and includes the application 108 setting radio presets in the AV 114 based on the user preferences.

A process step 128 follows the process step 126 and includes the application 108 setting a volume of the radio in the AV 114 based on the user preferences. A process step 130 follows the process step 128 and includes the application 108 opening or closing one or more windows of the AV 114 based on the user preferences. A process step 132 follows the process step 130 and includes the application 108 opening or closing the sunroof (if any) the AV 114 based on the user preferences. A process step 134 follows the process step 132 and includes the application 108 adjusting one or more seats of the AV 114 based on the user preferences.

A process step 136 follows the process step 134 and includes the application 108 querying the user 102 regarding a confirmation honk for the AV 114. If a YES response follows the process step 136, a process step 138 occurs where the application 108 executes the confirmation honk. If a NO response follows the process step 136, the application 108 queries the user 102 as to whether the user 102 wants one or more doors of the AV 114 unlocked. If a YES response follows the process step 140, the application 108 sends an unlock command to unlock the one or more doors of the AV 114. If a NO response follows the process step 140, a process step 144 occurs, where the application 108 determines if the user 102 is ready to depart.

If a YES response follows the process step 144, a process step 146 occurs where the application 108 sends a depart command to the AV 114. A process step 148 follows the process step 146 and includes the application 108 providing a universal AV control interface.

A process step 150 follows the process step 148 and includes the application 108 providing audio/text location updates to the user 102. A process step 152 follows the process step 150 and includes the application 108 determining if the AV 114 has arrived. If a YES response follows the process step 152, a process step 154 occurs, where the application 108 announces the arrival of the AV 144. If a NO response follows the process step 152, a process step 156 occurs, where the application 108 configures the time/location delay. If a NO response or no response follows the process step 154, the application 108 configures a time delay at a process step 158.

A process step 160 follows the process step 154 and includes the application 108 determining if the one or more doors of the AV 114 should be unlocked. If a YES response follows the process step 160, the application 108 sends an unlock command to unlock the one or more doors of the AV 114. A process step 164 follows the process step 162 and includes the application 108 switching to an outdoor navigation mode. A process step 166 follows the process step 164 to conclude the method of FIG. 3.

Further, the challenge of locating the AV 114 is presented due to the inaccuracies of global positioning system (or GPS), which is the main navigation tool for the visually impaired community. Though the AV 114 will know it's accurate position, the GPS may only get the user 102 within approximately 50 to 100 feet of the location. The present invention seeks to close this gap. To do this, the system of the present invention provides a low power UWB anchor on the AV 114 and the user 102 may carry a small UWB tag. It should be appreciated that the UWB tag may be an external device or may be the built-in UWB of the computing device 106 (e.g., the smartphone).

Though this implementation is described, it should be appreciated that in all usage scenarios described herein, the UWB anchor and the UWB tag may be present on either end of the process and may be used interchangeably. Moreover, it should be appreciated that each of the UWB anchor and the UWB tag may have Bluetooth capabilities, along with the UWB capabilities described herein. In some examples, the UWB tag may be on the vehicle (e.g., the AV 114) and the UWB anchor may be associated with the user 102. In other examples, the UWB tag may be associated with the user 102 and the UWB anchor may be on the vehicle (e.g., the AV 114). Further, each of the UWB anchor and the UWB tag may have rechargeable batteries and circuitry to support recharging. Further, it should be appreciated that in some implementations, power saving methods will be implemented such as UWB only being enabled when commanded through a Bluetooth (BLE) command.

The UWB anchor may be powered by a battery of the AV 114 and may be designed to mount in a waterproof housing on a window of the AV 114 or may be incorporated into the AV's 114 current technology housing. This can be done as an original piece of equipment or an add-on. Power may be provided by a 12 v or 5 v USB. In other examples, the power may be provided through other sources not explicitly listed herein, such as USB, PoE, or any other sufficient power source known to those having ordinary skill in the art.

Figure 5:
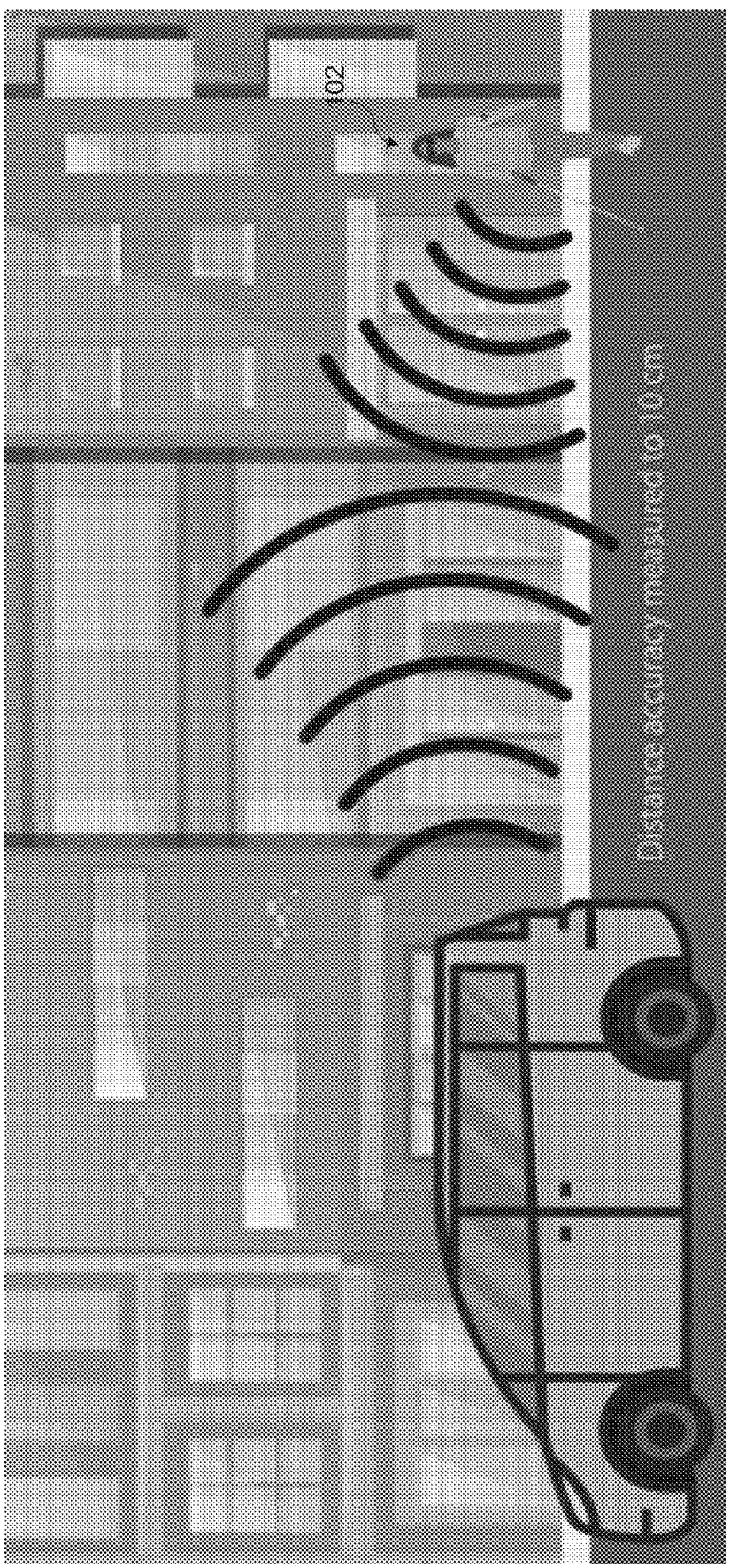
FIG. 5 depicts a schematic diagram depicting distance accuracy using UWB technology, according to at least some embodiments disclosed herein.

The UWB tag communicates with the user's application 108 on the computing device 106 (e.g., smartphone) via Bluetooth, or may communicate directly through the computing devices 106 built-in UWB functionality, and may allow the user 102 to determine the exact distance to the AV 114 down to about a 10-centimeter accuracy (as shown in FIG. 5). Specifically, the UWB technology measures the distance between two UWB devices by using two-way communications between the UWB anchor on the AV 114 and UWB tag the user 102 is carrying. The UWB tag measures the time of flight of the RF signal between itself and the anchor. The roundtrip time of the signal is multiplied by the speed of light and divided by two to get a distance between the two devices.

On the user 102 side, the UWB tag may fit in different housings so the user 102 can attach them to a cane, their phone, or wear them on a lanyard, or can be built into the computing device 106 (e.g., the smartphone). As described herein, the UWB tag and the UWB anchor are interchangeable. The UWB tag has a rechargeable battery and will only emit a signal when movement is detected to increase battery life. Additionally, the UWB tag will communicate with the user's computing device 106 over Bluetooth or another similar means. Specifically, the UWB tag will send the distance to the UWB anchor located on the AV 114 to the application 108.

In some implementations, the system can be private with only the location data appearing on the user's computing device 106, or the data can be sent to the cloud in case the AV 114 needs to move closer to the user 102. Once the user 102 approaches the AV 114 as detected by the accurate distance calculated by the UWB anchors, the AV 114 can unlock the proper door and configure all environmental controls to the user's preferences if not previously done.

In other embodiments, the user 102 may not wish to purchase or carry the UWB tag. In these instances, the user 102 may utilize Bluetooth or the built-in UWB functionality on their computing device 106 to detect the same UWB anchor transmitting a Bluetooth Low Energy (BLE) signal or the UWB signal on the AV 114. As described herein, "BLE" is a wireless personal area network technology aimed at applications in the healthcare, fitness, anchors, security, and home entertainment industries. When compared to classic Bluetooth, Bluetooth Low Energy is intended to provide considerably reduced power consumption and cost while maintaining a similar communication range. Mobile operating systems including iOS, Android, Windows Phone and BlackBerry, as well as macOS, Linux, Windows 8 and Windows 10, natively support Bluetooth Low Energy. Once the user 102 is within a few feet of the AV 114, a signal may be sent to unlock the door of the AV 114 on the sidewalk side of the AV 114 (e.g., depending on API access to the AV 114).

Figure 4:
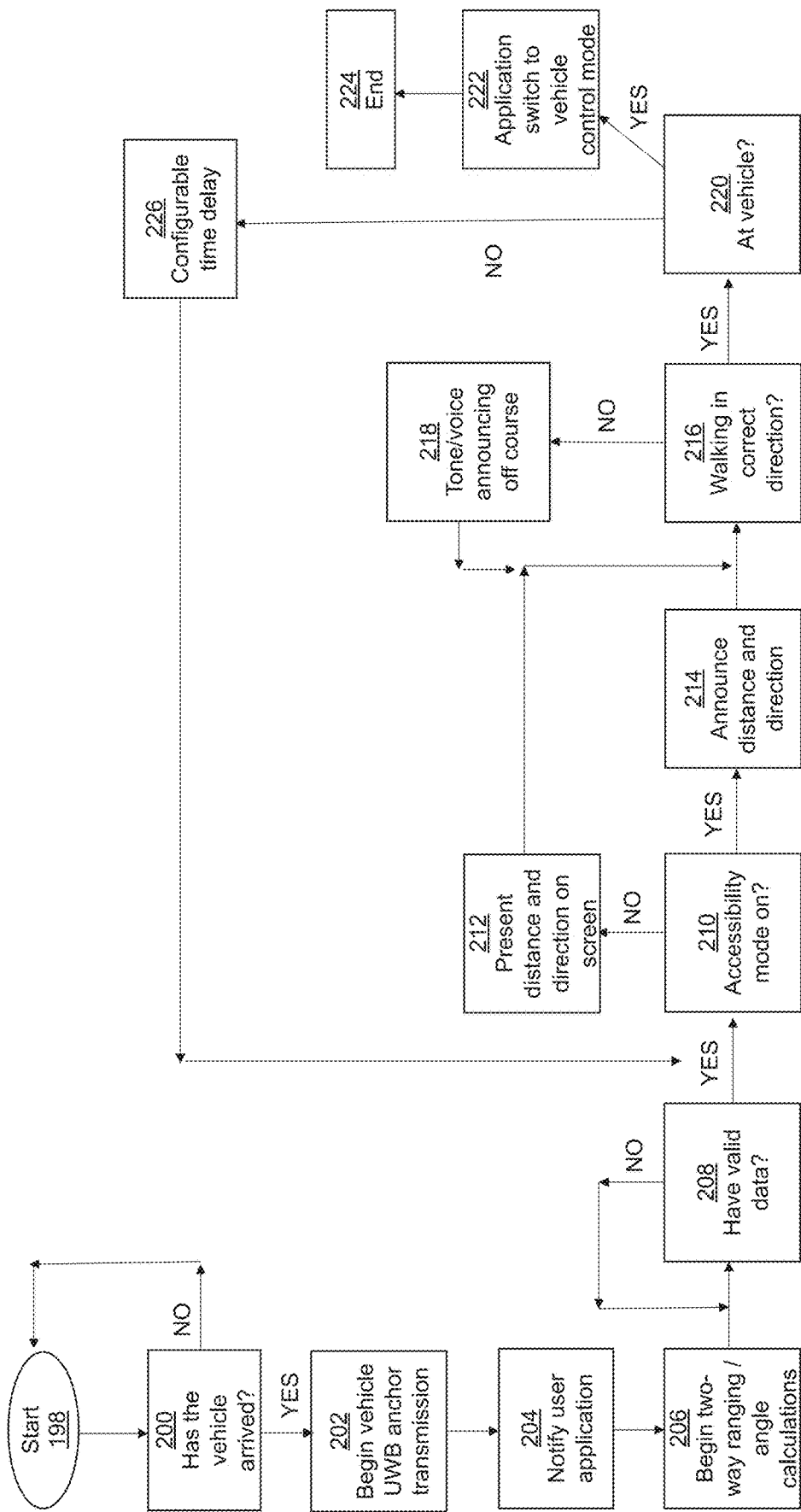
FIG. 4 depicts a block diagram of application commands/processes using UWB technology, according to at least some embodiments disclosed herein.

FIG. 4 depicts a block diagram of application commands/processes using the UWB technology. A method of FIG. 4 begins at a process step 198. A process step 200 follows the process step 198 and includes determining if the AV 114 has arrived. If a YES response follows the process step 200, a process step 202 occurs, where the AV 114 UWB anchor transmission begins. A process step 204 follows the process step 202 where the user 102 is notified via the application 108. A process step 206 follows the process step 204 and includes beginning the two-way ranging/angle calculations using the UWB technology between the UWB anchor on the AV 114 and the UWB tag of the user 102. As described, the UWB anchor and the UWB tag may be present on either end of the process and may be used interchangeably.

A process step 208 follows the process step 206, where it is determined if there is valid data. If a YES response follows the process step 208, a process step 210 occurs where it is determined if the accessibility mode is on. If a NO response follows the process step 210, a process step 212 occurs, where the present distance and direction is depicted on the screen. If a YES response follows the process step 210, a process step 214 occurs, where the distance and direction is announced. A process step 216 follow the process step 214 where it is determined if the user 102 is walking in the correct direction.

If a NO response follows the process step 216, a process step 218 occurs, where a tone/voice notification announces that the user 102 is off course so that the user 102 may correct their path. If a YES response follows the process step 216, a process step 220 occurs where it is determined if the user 102 is at the AV 114. If a NO response follows the process step 220, a process step 226 occurs, where it is determined that there is a configurable time delay. If a YES response follows the process step 220, a process step 222 occurs where the application 108 switches to a vehicle control mode. A process step 224 follows the process step 222 to end the method of FIG. 4.

Though UWB technology is helpful when the user 102 is within approximately 300 feet of the AV 114, having the AV 114 arrive or drop off the user 102 at an exact location is important in simplifying the ability to find the AV 114. When the user 102 orders a car from Uber/Lyft/taxi, the user 102 provides an address. An address is helpful if the user 102 resides in a single-family home where the address approximates the location of the front door, but if the user 102 lives in a big multi-tenant building, is at an arena, or is at a building with multiple entrances, specifying a particular pickup or drop-off location can vary greatly in accuracy. For those living with low vision, blindness, or deaf blindness, being dropped off around the corner or down the road from ones buildings entrance can cause undue stress and hardship.

Figure 6:
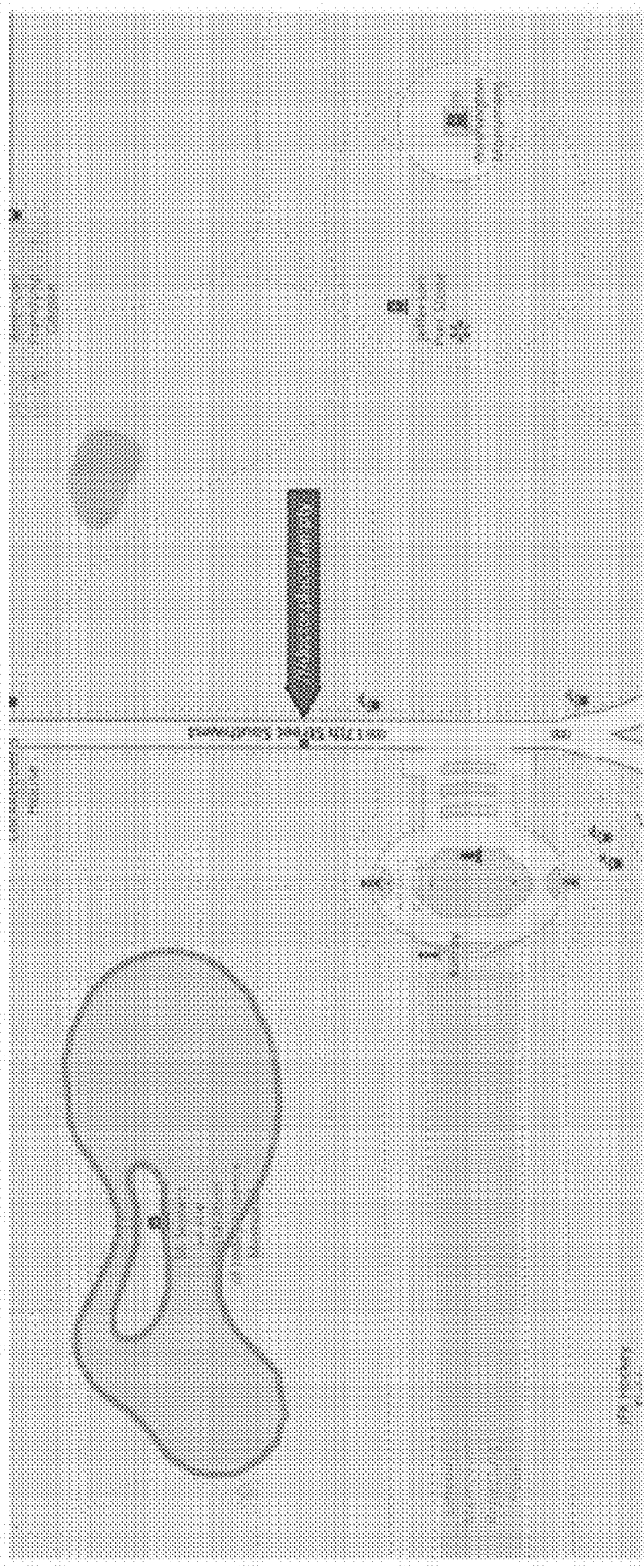
FIG. 6 depicts a schematic diagram depicting use of a three word string for a location, according to at least some embodiments disclosed herein.

To address these concerns, the present invention provides a simple method of commanding the AV 114 exactly where to drop off or pick up the user 102. The method utilizes a technology that divides the world into 10 foot×10 foot square areas and gives each square a unique combination of three words or a three word string to give a precise location for the user 102 to be picked up or dropped off. In some examples, this solution integrates What3Words technology to achieve this, as shown in FIG. 6. Through the application 108, the user 102 can select their pickup point and destination point using the unique three word combination or a three word string that identifies their exact location.

As an illustrative example of this, Person A is meeting Person B at Constitution Gardens Pond near the World War II Memorial in Washington, DC. To communicate the precise location where the AV 114 drops off Person A, Person A may say "Let's meet at doctor.placed.empty." These three words are then entered into the application 108 of the computing device 106 as a destination and the AV 114 may pick the user 102 up or drop the user 102 off at that precise location.

Further, this method provides a safety feature, as the application 108 is always capable of telling the user 102 their current location, physical addresses close to the current location of the user 102, or the closest intersection for the user 102. If the user 102 needs to call for emergency help, the user 102 can tell the emergency personnel three words of their exact location or may utilize the application 108 to translate these three words into a precise GPS coordinate.

Figure 7:
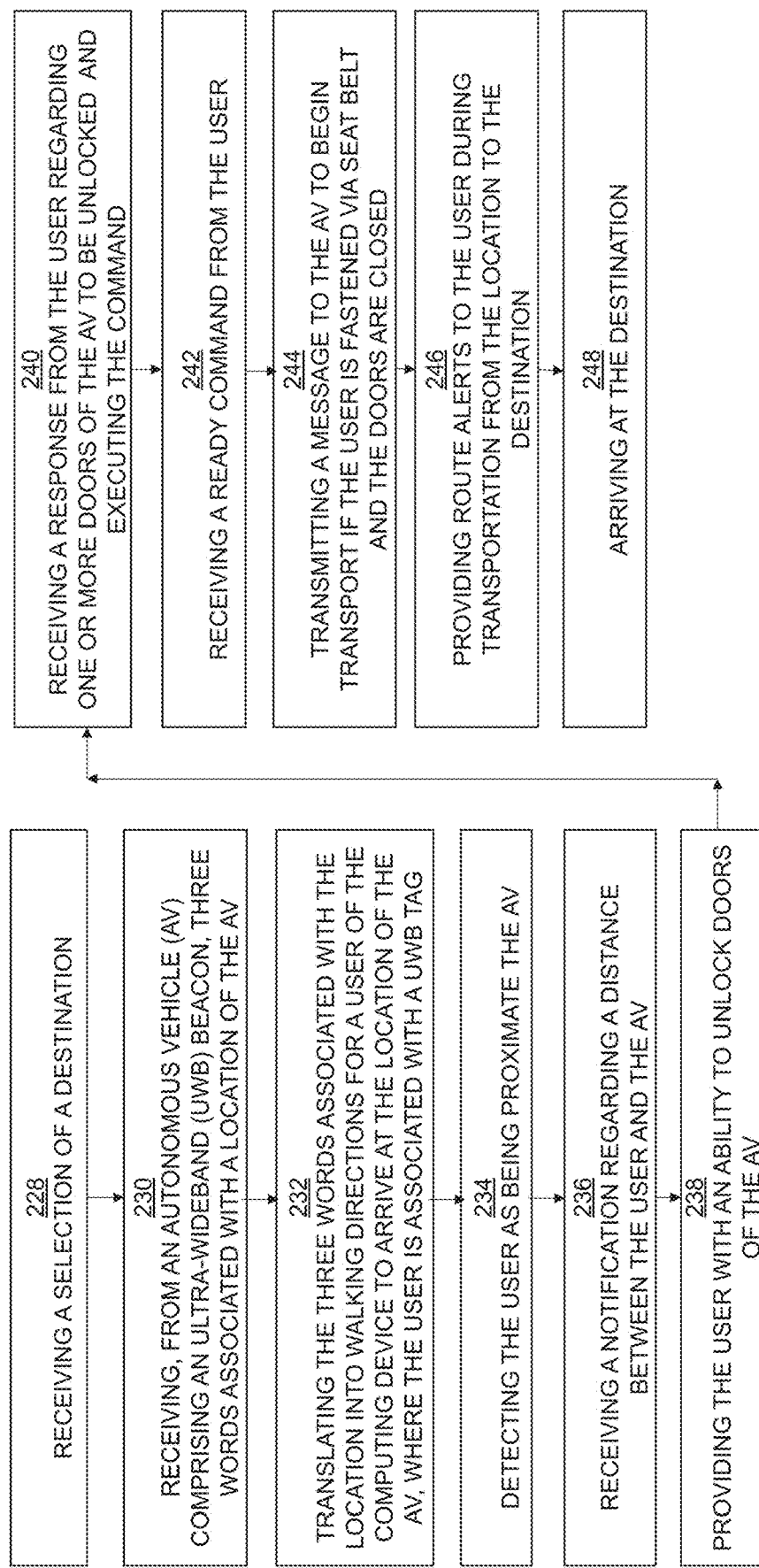
FIG. 7 depicts a block diagram of a method executed using the system of FIG. 1, according to at least some embodiments disclosed herein.

A method executed using the system of the present invention is depicted in FIG. 7 and includes numerous process steps. For example, the method of FIG. 7 begins at a process step 228 that includes the application 108 of the computing device 106 receiving a selection of a destination. During this process step, the user's approximate location is determined by GPS, or the user 102 can enter an exact location via a three word string as a starting point. The user 102 is also capable of searching for and selecting the destination location and completing the workflow of summoning the AV 114. The user 102 can choose a destination by address, by a name of the location, or by the exact three word location.

The process step 228 is followed by a process step 230 that includes the application 108 receiving, from the AV 114 comprising the UWB anchor, a unique three word string associated with a precise location of the AV 114 or GPS coordinates. The UWB anchor and the UWB tag are interchangeable. A process step 232 follows the process step 230 and includes the application 108 translating the three word string associated with the location into walking directions for the user 102 to arrive at the location of the AV 114. The user 102 may also have a UWB tag.

A process step 234 follows the process step 232 and includes detecting the user 102 as being proximate the AV 114 in response to the UWB tag communicating with the UWB anchor. A process step 236 follows the process step 234 and includes receiving, at the application 108, a notification regarding a distance between the user 102 and the AV 114.

A process step 238 follows the process step 236 and includes the application 108 providing the user 102 with an ability to unlock one or more doors of the AV 114. It should be appreciated that a safety feature is included in this system where only the particular user 102 who engaged the AV 114 will be granted the ability to unlock the one or more doors of the AV 114. A process step 240 follows the process step 238 and includes the application 108 receiving a response from the user 102 regarding the one or more doors of the AV 114 to be unlocked. This command is executed to unlock the selected one or more doors of the AV 114.

A process step 242 follows the process step 240 and includes the application 108 receiving a ready command from the user 102. A process step 244 follows the process step 242 and includes the application 108 transmitting a message to the AV 114 to begin transport if the user 102 is fastened via seat belt and if the doors of the AV 114 are closed. If there is an error, such as one or more seat belts not being fastened or one or more doors of the AV 114 being ajar, the error is communicated to the user 102 via a notification on the application 108. Once this error is remedied, the transportation begins.

A process step 246 follows the process step 244 and includes the application 108 providing route alerts to the user 102 during transportation from the location to the destination. Such route alerts include directional, distance, and/or location information. As can be customized in the computing device 106 settings, these updates can be temporary (e.g., set to disappear after a given timeframe), text-based (so magnification, screen reader, and braille display users can access them), and/or can include haptic feedback.

Illustrative examples of the route alerts include the following: "Approaching Broadway and 3rd Street. 1.5 miles until turning left on Grant Road."; "Approaching the Broadway and Grant Road intersection. Turning left and heading north for 2 miles. The destination will be on the right."; "0.5 miles to destination on the right, United Medical Center"; and "You have arrived at United Medical Center. Please exit the vehicle to the right where you will find the sidewalk."

A process step 248 follows the process step 246 and includes the AV 114 arriving at the destination. The process step 248 concludes the method of FIG. 7.

It should be appreciated that all alerts from the application 108 are accessible to the user 102 by screen reader, active braille display, and feature various notification styles, including text-based and haptic feedback. Moreover, if for any reason the AV 114 is in an auto accident with the user 102 onboard, the user 102 is notified through the application 108 of the emergency, is provided an estimated postal address location of the AV 114, is provided the precise three word location of the AV 114, and is provided a means or a button to notify emergency assistance immediately.

Figure 8:
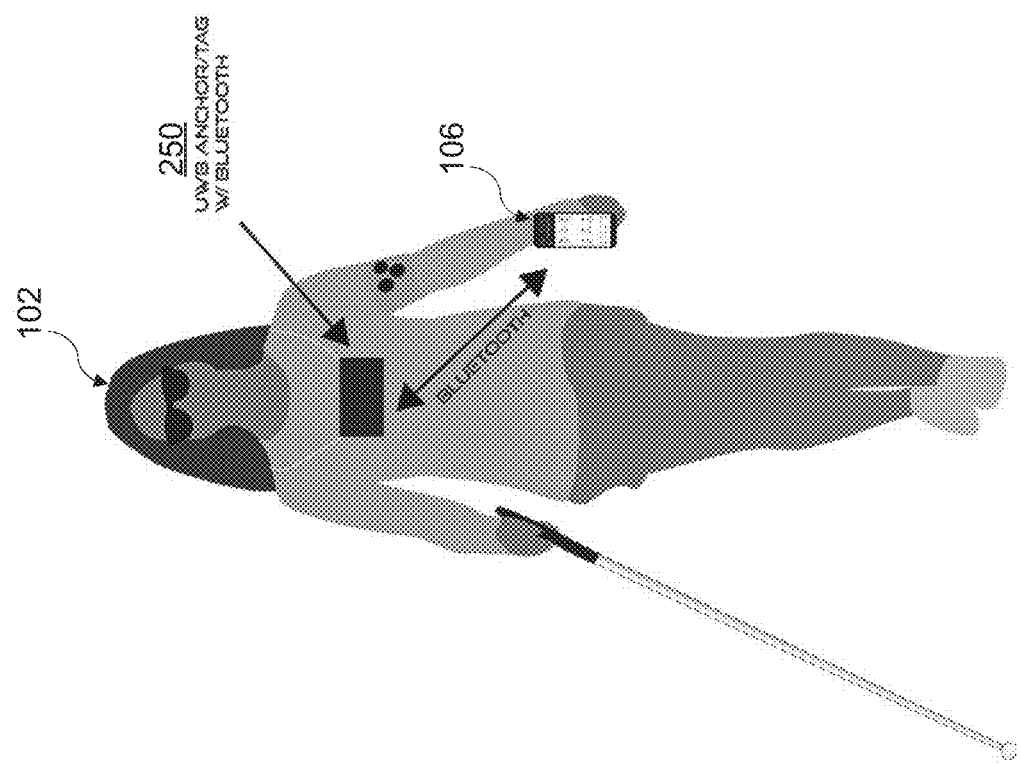
FIG. 8 depicts a schematic diagram of a user and a UWB anchor or tag with Bluetooth capability, according to at least some embodiments disclosed herein.
Figure 9:
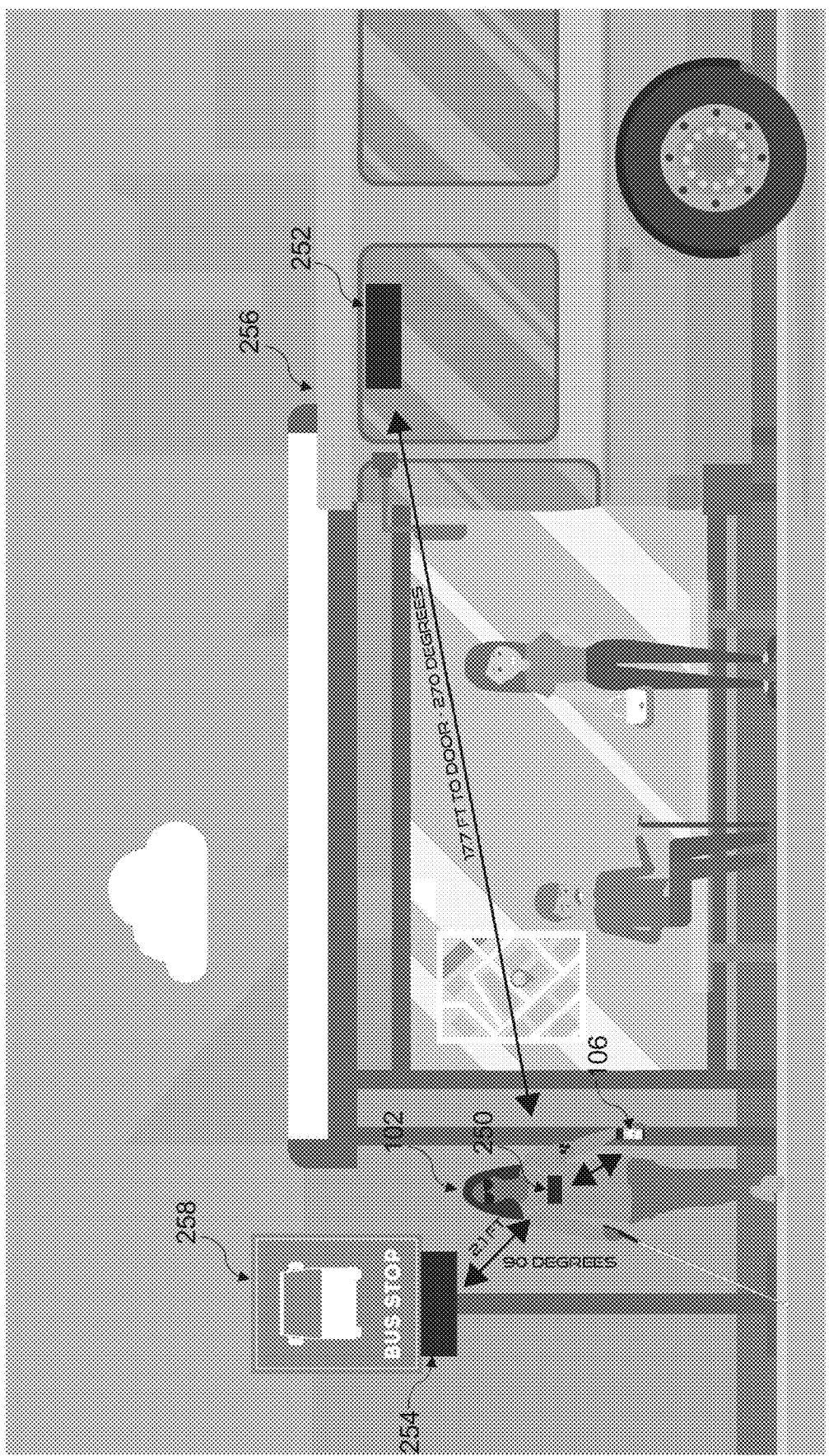
FIG. 9 depicts a schematic diagram of an illustrative outdoor navigation use example of the present invention at a bus station, according to at least some embodiments disclosed herein.
Figure 10:
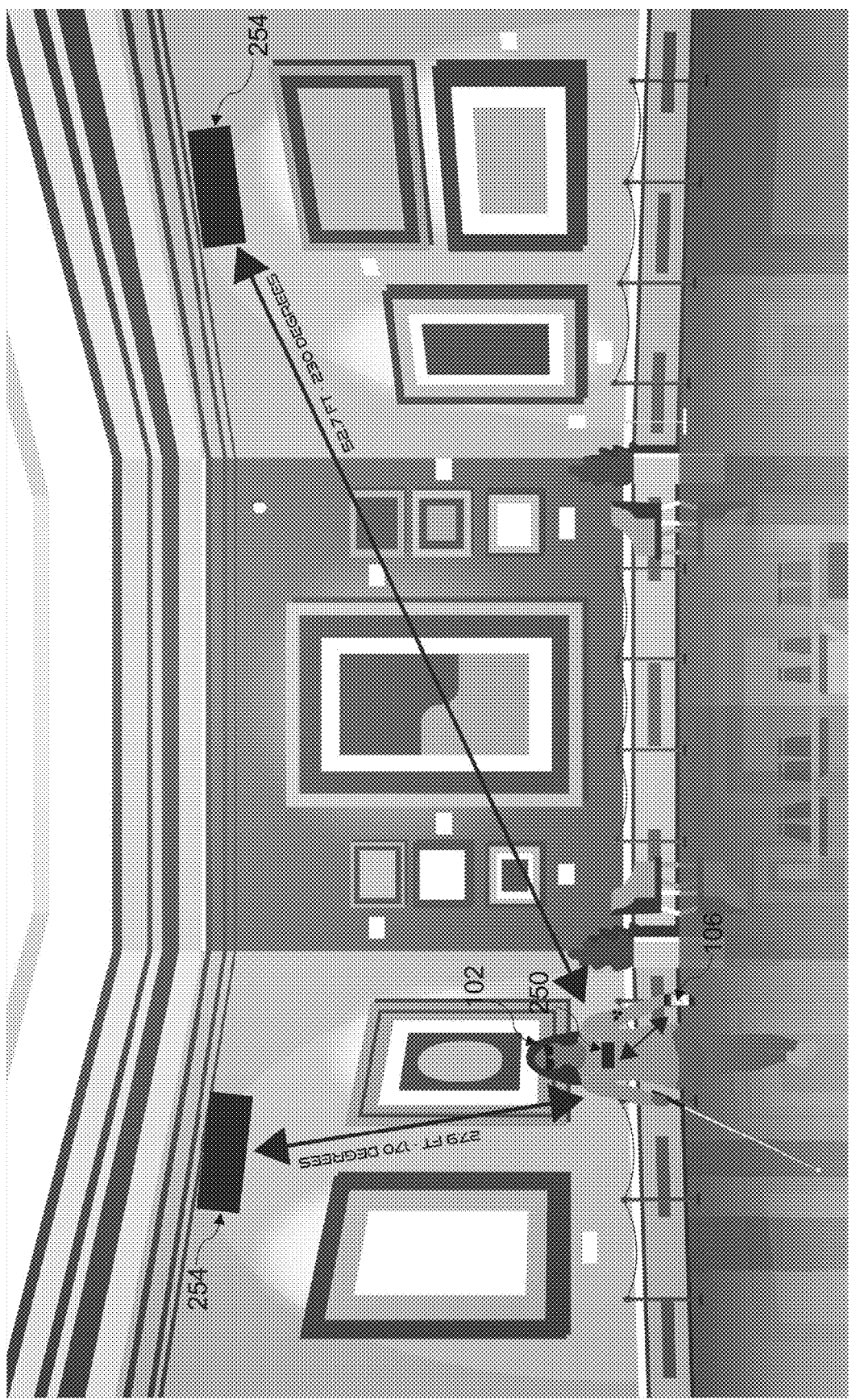
FIG. 10 depicts a schematic diagram of an illustrative indoor use example of the present invention at a museum, according to at least some embodiments disclosed herein.

As shown in FIG. 8, the user 102 (e.g., a visually impaired, elderly, deaf, blind, and/or cognitively impaired user) may wear or carry (in any fashion) a UWB anchor or tag 250. The UWB anchor or tag 250 communicates with the user's application 108 on the computing device 106 (e.g., smartphone) via Bluetooth and can communicate with other UWB anchors or tags. In some examples, the user 102 may carry a UWB-enabled smartphone instead of utilizing an external UWB anchor or tag. As explained, though numerous examples describe use of the system with AVs, it should be appreciated that this system described herein may be used with rideshare services, personal vehicles, subways, buses, trains, indoor navigation, outdoor navigation, etc. FIG. 9 shows an outdoor use of the present invention at a bus terminal and FIG. 10 shows an indoor use of the present invention at a museum.

As shown in FIG. 9, the UWB anchor or tag 250 worn by the user 102 communicates with the user's application 108 on the computing device 106 (e.g., smartphone) via Bluetooth and communicates with one or more other UWB anchors or tags (e.g., a UWB anchor or tag 254 located on stationary signage 258 at a bus terminal and/or a UWB anchor or tag 252 located on a moving vehicle 256, such as a bus). In other examples, the UWB anchor or tag 250 is built into the user's computing device 106 instead of being worn by the user 102 and is configured to communicate with the one or more other UWB anchors or tags (e.g., the UWB anchor or tag 254 and/or the UWB anchor or tag 252).

Figure 12:
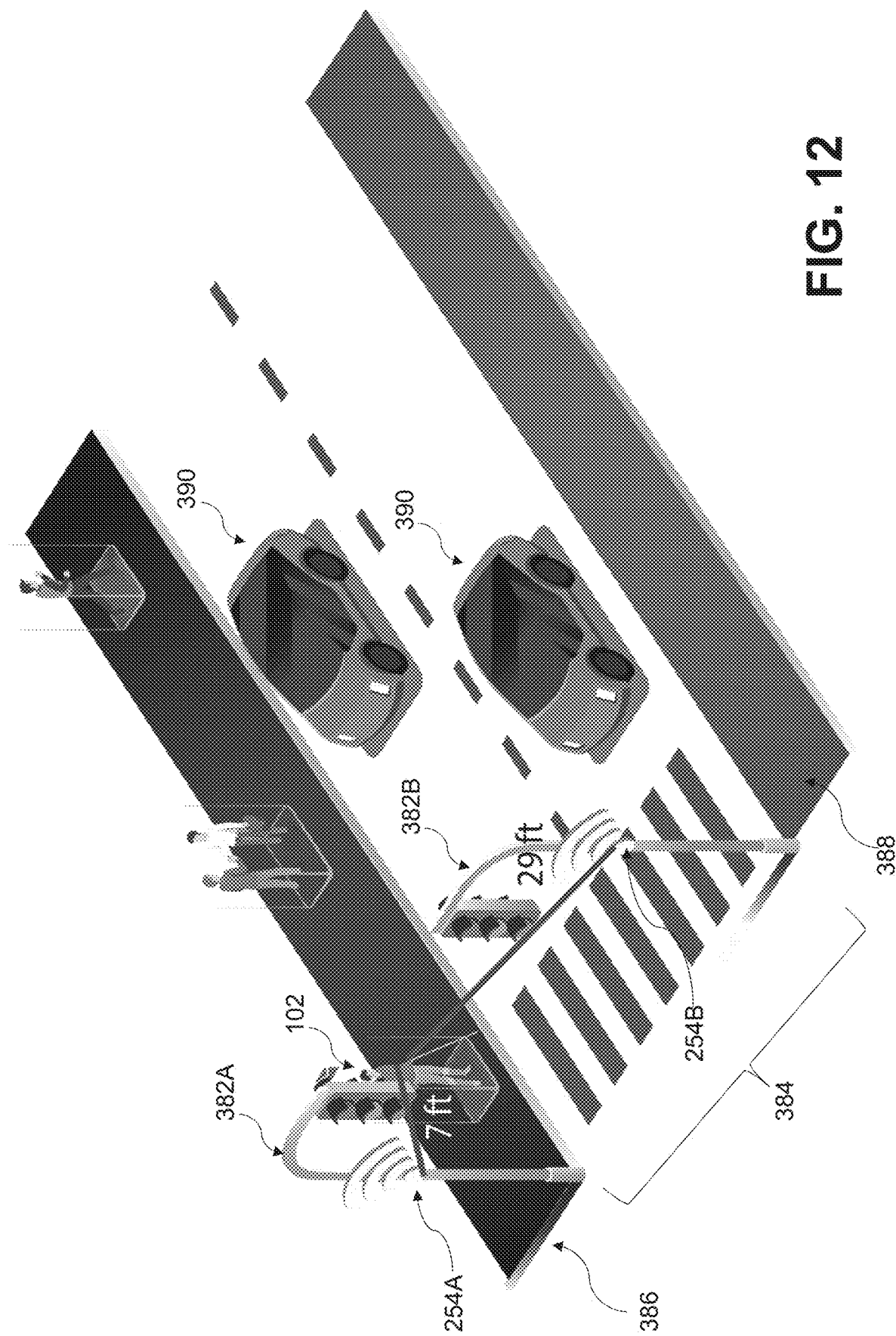
FIG. 12 depicts a schematic diagram of an illustrative outdoor navigation use example of the present invention at a traffic intersection, according to at least some embodiments disclosed herein.

FIG. 12 depicts a schematic diagram of an illustrative outdoor navigation use example of the present invention at a traffic intersection. In this scenario, a first traffic light pole 382A is located on a first street 386 and a second traffic light pole 382B is located on a second street 388. The first street 386 is separated by two lanes of traffic from the second street 388. Vehicles 390 are depicted traveling on the two lanes of traffic. An intersection 384 is located between the first street 386 and the second street 388. Moreover, the UWB anchor or tag (not shown) worn by the user 102 communicates with the user's application 108 on the computing device 106 (e.g., the smartphone) via Bluetooth and communicates with one or more other UWB anchors or tags (e.g., a first UWB anchor or tag 254A located on the first traffic light pole 382A and/or a second UWB anchor or tag 254B located on the second traffic light pole 382B). In other examples, the UWB anchor or tag (not shown) is built into the user's computing device 106 instead of being worn by the user 102 and is configured to communicate with the one or more other UWB anchors or tags (e.g., the first UWB anchor or tag 254A and/or the second UWB anchor or tag 254B). It can be appreciated that there may be multiple traffic poles in a given intersection each equipped with its UWB anchors or tags.

As discussed herein, the present invention focuses on the visually impaired, the elderly, the deaf, the blind, and the cognitively impaired and is designed to be vehicle agnostic. The design can be easily incorporated as a piece of original equipment or an add-on to any vehicle that allows third-party control of destination, safety, and environmental controls.

As shown in FIG. 10, the UWB anchor or tag 250 worn by the user 102 communicates with the user's application 108 on the computing device 106 (e.g., the smartphone) via Bluetooth and communicates with one or more other UWB anchors or tags (e.g., one or more UWB anchors or tags 254 located inside at a museum). In other examples, the user 102 can alternatively use the built-in UWB functionality of the computing device 106 (e.g., the smartphone).

Figure 11:
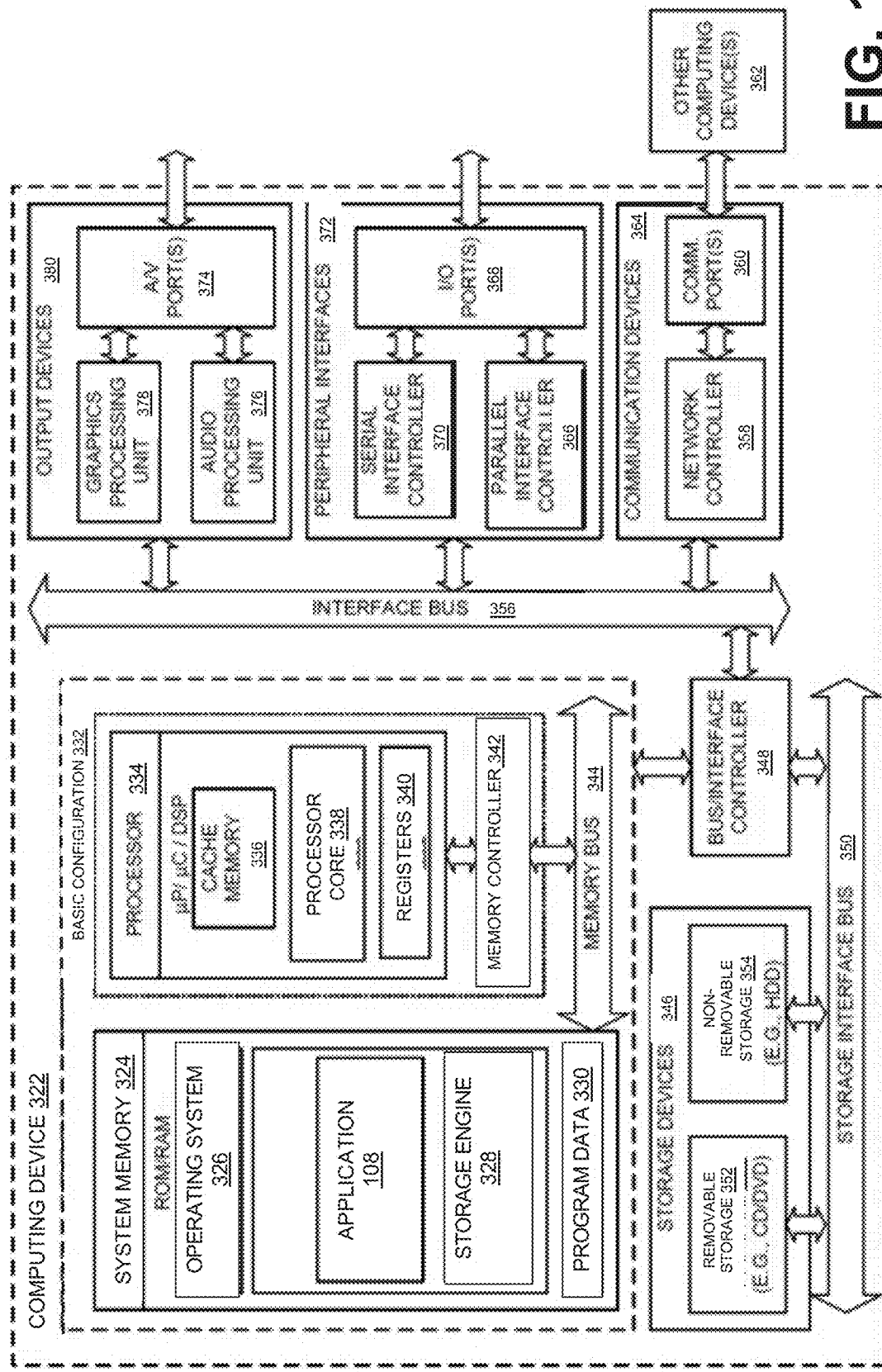
FIG. 11 is a block diagram of a computing device included within the system of FIG. 1, in accordance with embodiments of the present invention.

FIG. 11 is a block diagram of a computing device included within the system of FIG. 1, in accordance with embodiments of the present invention. In some embodiments, the present invention may be a computer system, a method, and/or the computing device 106 (of FIG. 1) or the computing device 322 (of FIG. 11). A basic configuration 332 of a computing device 322 is illustrated in FIG. 11 by those components within the inner dashed line. In the basic configuration 332 of the computing device 322, the computing device 322 includes a processor 334 and a system memory 324. In some examples, the computing device 322 may include one or more processors and the system memory 324. A memory bus 344 is used for communicating between the one or more processors 334 and the system memory 324.

Depending on the desired configuration, the processor 334 may be of any type, including, but not limited to, a microprocessor (µP), a microcontroller (µC), and a digital signal processor (DSP), or any combination thereof. Further, the processor 334 may include one more levels of caching, such as a level cache memory 336, a processor core 338, and registers 340, among other examples. The processor core 338 may include an arithmetic logic unit (ALU), a floating point unit (FPU), and/or a digital signal processing core (DSP Core), or any combination thereof. A memory controller 342 may be used with the processor 334, or, in some implementations, the memory controller 342 may be an internal part of the memory controller 342.

Depending on the desired configuration, the system memory 324 may be of any type, including, but not limited to, volatile memory (such as RAM), and/or non-volatile memory (such as ROM, flash memory, etc.), or any combination thereof. The system memory 324 includes an operating system 326, one or more applications, such as the application 108, and program data 330. In some embodiments, the application 108 may be an engine, a software program, a service, or a software platform, as described infra. The system memory 324 may also include a storage engine 328 that may store any information disclosed herein.

Moreover, the computing device 322 may have additional features or functionality, and additional interfaces to facilitate communications between the basic configuration 332 and any desired devices and interfaces. For example, a bus/interface controller 348 is used to facilitate communications between the basic configuration 332 and data storage devices 346 via a storage interface bus 350. The data storage devices 346 may be one or more removable storage devices 352, one or more non-removable storage devices 354, or a combination thereof. Examples of the one or more removable storage devices 352 and the one or more non-removable storage devices 354 include magnetic disk devices (such as flexible disk drives and hard-disk drives (HDD)), optical disk drives (such as compact disk (CD) drives or digital versatile disk (DVD) drives), solid state drives (SSD), and tape drives, among others.

In some embodiments, an interface bus 356 facilitates communication from various interface devices (e.g., one or more output devices 380, one or more peripheral interfaces 372, and one or more communication devices 364) to the basic configuration 332 via the bus/interface controller 356. Some of the one or more output devices 380 include a graphics processing unit 378 and an audio processing unit 376, which are configured to communicate to various external devices, such as a display or speakers, via one or more A/V ports 374.

The one or more peripheral interfaces 372 may include a serial interface controller 370 or a parallel interface controller 366, which are configured to communicate with external devices, such as input devices (e.g., a keyboard, a mouse, a pen, a voice input device, or a touch input device, etc.) or other peripheral devices (e.g., a printer or a scanner, etc.) via one or more I/O ports 368.

Further, the one or more communication devices 364 may include a network controller 358, which is arranged to facilitate communication with one or more other computing devices 362 over a network communication link via one or more communication ports 360. The one or more other computing devices 362 include servers, the database, mobile devices, and comparable devices.

The network communication link is an example of a communication media. The communication media are typically embodied by the computer-readable instructions, data structures, program modules, or other data in a modulated data signal, such as a carrier wave or other transport mechanism, and include any information delivery media. A "modulated data signal" is a signal that has one or more of its characteristics set or changed in such a manner as to encode information in the signal. By way of example, and not limitation, the communication media may include wired media (such as a wired network or direct-wired connection) and wireless media (such as acoustic, radio frequency (RF), microwave, infrared (IR), and other wireless media). The term "computer-readable media," as used herein, includes both storage media and communication media.

It should be appreciated that the system memory 324, the one or more removable storage devices 352, and the one or more non-removable storage devices 354 are examples of the computer-readable storage media. The computer-readable storage media is a tangible device that can retain and store instructions (e.g., program code) for use by an instruction execution device (e.g., the computing device 322). Any such, computer storage media is part of the computing device 322.

The computer readable storage media/medium can be a tangible device that can retain and store instructions for use by an instruction execution device. The computer readable storage media/medium may be, for example, but is not limited to, an electronic storage device, a magnetic storage device, an optical storage device, an electromagnetic storage device, and/or a semiconductor storage device, or any suitable combination of the foregoing. A non-exhaustive list of more specific examples of the computer readable storage media/medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and/or a mechanically encoded device (such as punch-cards or raised structures in a groove having instructions recorded thereon), and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Aspects of the present invention are described herein regarding illustrations and/or block diagrams of methods, computer systems, and computing devices according to embodiments of the invention. It will be understood that each block in the block diagrams, and combinations of the blocks, can be implemented by the computer-readable instructions (e.g., the program code).

The computer-readable instructions are provided to the processor 334 of a general purpose computer, special purpose computer, or other programmable data processing apparatus (e.g., the computing device 322) to produce a machine, such that the instructions, which execute via the processor 334 of the computer or other programmable data processing apparatus, create means for implementing the functions/acts specified in the block diagram blocks. These computer-readable instructions are also stored in a computer-readable storage medium that can direct a computer, a programmable data processing apparatus, and/or other devices to function in a particular manner, such that the computer-readable storage medium having instructions stored therein comprises an article of manufacture including instructions, which implement aspects of the functions/acts specified in the block diagram blocks.

The computer-readable instructions (e.g., the program code) are also loaded onto a computer (e.g. the computing device 322), another programmable data processing apparatus, or another device to cause a series of operational steps to be performed on the computer, the other programmable apparatus, or the other device to produce a computer implemented process, such that the instructions, which execute on the computer, the other programmable apparatus, or the other device, implement the functions/acts specified in the block diagram blocks.

Computer readable program instructions described herein can also be downloaded to respective computing/processing devices from a computer readable storage medium or to an external computer or external storage device via a network (e.g., the Internet, a local area network, a wide area network, and/or a wireless network). The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer/computing device, partly on the user's computer/computing device, as a stand-alone software package, partly on the user's computer/computing device and partly on a remote computer/computing device or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to block diagrams of methods, computer systems, and computing devices according to embodiments of the invention. It will be understood that each block and combinations of blocks in the diagrams, can be implemented by the computer readable program instructions.

The block diagrams in the Figures illustrate the architecture, functionality, and operation of possible implementations of computer systems, methods, and computing devices according to various embodiments of the present invention. In this regard, each block in the block diagrams may represent a module, a segment, or a portion of executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block and combinations of blocks can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method executed by an application of a computing device to increase an ability of a person with a visual, a hearing, a mobility and/or a cognitive disability to orient, locate, and travel within an environment, the method comprising:
   receiving selection of a destination;
   receiving, from a vehicle comprising an anchor, global positioning system (GPS) coordinates, a three word string associated with a location of the vehicle;
   translating the GPS coordinates and the three word string associated with the location into walking directions for a user of the computing device to arrive at the location of the vehicle, wherein the user has a tag;
   in response to determining that the user is proximate the vehicle by communication between the tag and the anchor,
   receiving a notification regarding at least one of a direction and a distance between the user and the vehicle; and
   providing the user with an ability to unlock doors of the vehicle;
   in response to receiving a response from the user regarding one or more doors of the vehicle to be unlocked, unlocking the one or more doors of the vehicle;
   in response to receiving a ready command from the user, transmitting a message to the vehicle to begin transport if the user is fastened via seat belt and if the doors are closed;
   providing route alerts to the user during transportation from the location to the destination; and
   arriving at the destination.

2. The method of claim 1, wherein the route alerts comprise directional, distance, and location information.

3. The method of claim 1, wherein the route alerts are temporary alerts, are text-based alerts and/or include haptic feedback.

4. The method of claim 1, wherein the anchor is mounted in a waterproof housing on a window of the vehicle or is incorporated into a technology housing of the vehicle.

5. The method of claim 1, wherein, during route, the application allows the user to change the destination of the vehicle to another destination and/or summon emergency services.

6. The method of claim 1, further comprising:
   configuring the vehicle with preferences for the user.

7. The method of claim 6, wherein the preferences are selected from the group consisting of: environmental controls of the vehicle, presets for a radio in the vehicle, a volume of the radio in the vehicle, an opened or a closed status for one or more windows of the vehicle, an opened or a closed status for a sunroof of the vehicle, and an adjustment of one or more seats in the vehicle.

8. The method of claim 1, wherein the anchor comprises an ultra-wideband (UWB) anchor, and wherein the tag comprises a UWB tag.

9. The method of claim 1, wherein the anchor comprises an ultra-wideband (UWB) anchor, and wherein the tag comprises Bluetooth on the computing device.

10. The method of claim 1, wherein the tag utilizes a built-in ultra-wideband (UWB) technology of the computing device to communicate with the anchor.

11. The method of claim 1, wherein the tag is an external device configured to communicate over Bluetooth to the computing device.

12. The method of claim 1, wherein the tag and the anchor are interchangeable.

13. The method of claim 1, further comprising:
   determining if the vehicle is in an accident prior to reaching the destination;
   notifying the user of the emergency;
   providing the user with an estimated address of the vehicle; and
   providing the user with a means to call emergency personnel to respond to the emergency.

* * * * *